US012717960B2

(12) United States Patent
Vauclair

(10) Patent No.: US 12,717,960 B2
(45) Date of Patent: Aug. 25, 2026

(54) METHOD AND DATA PROCESSING SYSTEM FOR EXECUTING AN OBFUSCATED COMPUTER PROGRAM

(71) Applicant: NXP B.V., Eindhoven (NL)

(72) Inventor: Marc Vauclair, Overijse (BE)

(73) Assignee: NXP B.V., Eindhoven (NL)

( * ) Notice: Subject to any disclaimer, the term of this patent is extended or adjusted under 35 U.S.C. 154(b) by 280 days.

(21) Appl. No.: 18/315,837

(22) Filed: May 11, 2023

(65) Prior Publication Data

US 2024/0378315 A1 Nov. 14, 2024

(51) Int. Cl.
*G06F 21/62* (2013.01)
*G06F 12/14* (2006.01)

(52) U.S. Cl.
CPC ...... *G06F 21/6245* (2013.01); *G06F 12/1416* (2013.01); *G06F 2212/1052* (2013.01)

(58) Field of Classification Search
CPC .......... G06F 21/00; G06F 21/14; G06F 21/60; G06F 21/75; G06F 21/86; G06F 21/79; G06F 21/80; G06F 21/6281; G06F 21/87; G06F 12/1416; G06F 2212/1052
See application file for complete search history.

(56) References Cited

U.S. PATENT DOCUMENTS 7,634,091 B2 12/2009 Zhou et al.
8,220,058 B2 7/2012 de Jong
8,621,187 B2 12/2013 Vauclair
8,856,500 B2 10/2014 Vauclair et al.
9,465,926 B2 10/2016 Teuwen et al.
9,965,401 B2 5/2018 Teuwen et al.
10,140,130 B2 * 11/2018 Wesie ..................... G06F 21/14
10,268,601 B2 * 4/2019 Okhravi .................. G06F 21/52
10,615,980 B2 4/2020 Kamal et al.
11,444,759 B2 9/2022 Pilozzi
(Continued)

OTHER PUBLICATIONS

Agrawal, Shashank et al.; "White-box Cryptography with Global Device Binding From Message-Recoverable Signatures and Token-Based Obfuscation"; Cryptology ePrint Archive Paper 2021/767; Received Jun. 9, 2021, Revised Oct. 21, 2022; https://eprint.iacr.org/2021/767.

(Continued)

*Primary Examiner* — Alexander Lagor
*Assistant Examiner* — Taylor P Vu

(57) ABSTRACT

A data processing system and a method are provided for executing an obfuscated computer program. A function that computes an obfuscated address for each instruction of a plurality of instructions is provided. The function is factored into a first part and a second part. The first part is stored in a memory of the data processing system. The second part and a secret are stored in a secure element of the data processing system, where the secure element is relatively more secure than the memory. An instruction of the plurality of instructions is received in the data processing system. A processor of the data processing system computes an intermediate obfuscated address using the first part. The intermediate obfuscated address is provided to the secure element. An unobfuscated address is computed in the secure element using the intermediate obfuscated address, the second part, and the secret.

14 Claims, 3 Drawing Sheets

(56) References Cited

U.S. PATENT DOCUMENTS

| | | | | |
|---|---|---|---|---|
| 2010/0191959 | A1* | 7/2010 | Czajkowski | G06F 21/75 713/190 |
| 2018/0349575 | A1* | 12/2018 | Somsikov | G06F 21/14 |
| 2020/0151305 | A1* | 5/2020 | Lam | G06F 8/41 |
| 2022/0058244 | A1* | 2/2022 | Hutschemaekers | G06F 21/14 |
| 2022/0129390 | A1* | 4/2022 | Shiner | G06F 12/1433 |

OTHER PUBLICATIONS

Kainth, Meha et al.; "Hardware-assisted code obfuscation for FPGA soft microprocessors"; 2015 Design, Automation & Test in Europe Conference & Exhibition (DATE); Mar. 9-13, 2015, Grenoble, France; DOI: 10.7873/DATE.2015.0498.

Nayak, Kartik et al.; "HOP: Hardware Makes Obfuscation Practical"; NDSS 2017 Symposium, 24th Annual Network and Distributed System Security Symposium; Feb. 2017, San Diego, California; http://dx.doi.org/10.14722/ndss.2017.23349.

Xu, Hui et al."Layered Obfuscation: A Taxonomy of Software Obfuscation Techniques for Layered Security"; Cybersecurity 3, Article No. 9; Published Apr. 3, 2020; https://doi.org/10.1186/s42400-020-00049-3.

Young, Adam L. et al.; "Malicious Cryptography Exposing Cryptovirology"; Copyright 2004; Chapter 5, pp. 103-112.

* cited by examiner

| Address | Code | Program Counter | Action |
|---|---|---|---|
| | | PC := 0; | exec(I[PC]) |
| 0 | I1 | PC := PC + 1 | exec(I[PC]) |
| 1 | I2 | PC := PC + 1 | exec(I[PC]) |
| 2 | I3 | PC := PC + 1 | exec(I[PC]) |
| 3 | I4 | PC := PC + 1 | exec(I[PC]) |
| 4 | I5 | PC := PC + 1 | exec(I[PC]) |
| 5 | I6 | PC := PC + 1 | exec(I[PC]) |
| 6 | HALT | | |

FIG. 2

| Addres s | Code | Program Counter | Action |
|---|---|---|---|
| | | PC := 0; PC := f(PC); | exec(I[PC]) |
| 0 | HALT | | |
| 1 | I5 | PC := f(PC) | exec(I[PC]) |
| 2 | I3 | PC := f(PC) | exec(I[PC]) |
| 3 | I2 | PC := f(PC) | exec(I[PC]) |
| 4 | I6 | PC := f(PC) | exec(I[PC]) |
| 5 | I4 | PC := f(PC) | exec(I[PC]) |
| 6 | I1 | PC := f(PC) | exec(I[PC]) |

FIG. 3

METHOD AND DATA PROCESSING SYSTEM FOR EXECUTING AN OBFUSCATED COMPUTER PROGRAM

BACKGROUND

Field

This disclosure relates generally to data processing, and more particularly, to a method and data processing system for executing an obfuscated computer program.

Related Art

Obfuscation is a technique used to complicate code. Obfuscation makes code harder to understand when it is de-compiled, but it typically has no effect on the functionality of the code. In particular, obfuscated code is source code in a computer programming language that has been made difficult to understand. Programs known as obfuscators transform human-readable code into obfuscated code using various techniques. Obfuscating code to prevent reverse engineering is typically done to manage risks that stem from unauthorized access to source code. For example, unauthorized access to the source code can result in loss of sensitive technical information, and make it easier for an adversary to probe for application vulnerabilities. Unauthorized access may also result in loss of revenue that is caused when applications are reverse engineered and then recompiled or modified to circumvent usage control. Code is obfuscated to manage these risks.

However, executing obfuscated code is known to suffer from various disadvantages. One disadvantage is that the code obfuscation may negate execution locality properties on which processor cache and pipeline architectures are based. Generally, execution locality refers to sequences of instructions constructed such that the advantages of hardware optimizations, e.g., pipelining and caching are effective in modern processors. However, obfuscated programs using conventional control flow obfuscation techniques may reduce the advantages provided by hardware optimizations build into, e.g., host processors that receive the obfuscated code. Executing the obfuscated code may reduce any performances gains expected from the hardware optimizations. Therefore, a need exists for a method and data processing system for executing obfuscated code that preserves the locality properties.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 illustrates an unobfuscated computer program in accordance with an embodiment.

FIG. 3 illustrates an obfuscated computer program in accordance with an embodiment.

DETAILED DESCRIPTION

Figure 1:
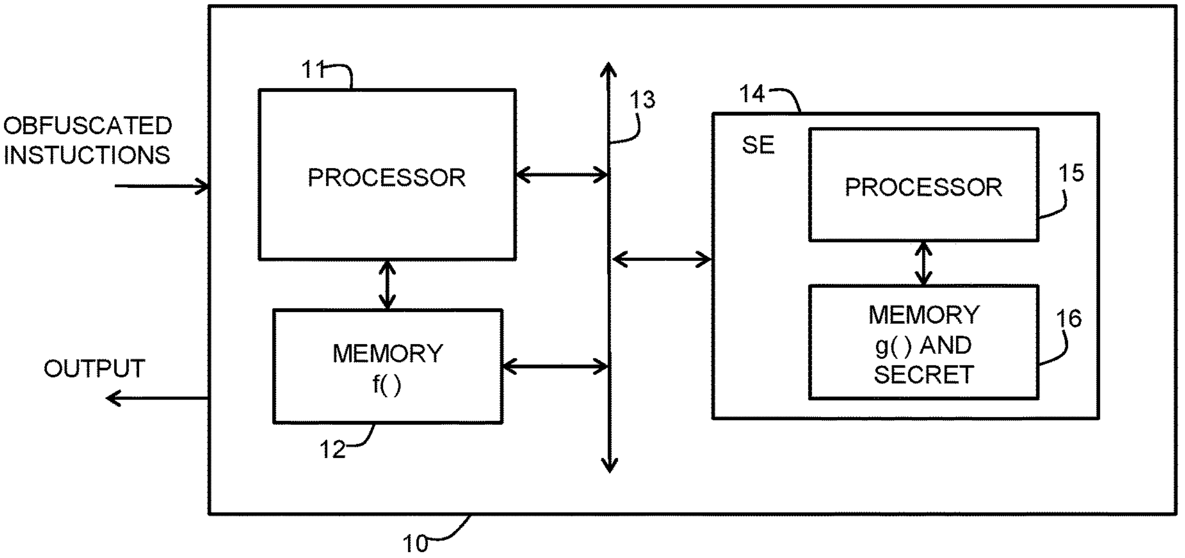
FIG. 1 illustrates a data processing system in accordance with an embodiment.

Generally, there is provided, a method and data processing system for executing an obfuscated computer program. The computer program includes a plurality of instructions to be executed by a processor. In the method, an obfuscated address is received by a data processing system. The obfuscated address is computed for each instruction of the plurality of instructions using a function. The function may be a randomization function and is factored into a first part and a second part. The first part is stored in a memory of the data processing system. The second part and a secret are stored in a memory of a secure element of the data processing system, where the secure element is relatively more secure than the memory. In one embodiment, the secure element is embedded in the data processing system. The processor computes an intermediate obfuscated address for an instruction of the obfuscated computer program using the first part. The intermediate obfuscated address is provided to the secure element. In the secure element an unobfuscated address is computed using the intermediate obfuscated address, the second part, and the secret. In one embodiment, the secure element and the processor are implemented on the same integrated circuit.

In a data processing system, using software only obfuscation may not be secure enough. On the other hand, hardware obfuscation can be made significantly more secure but this requires cooperation between the processor and the obfuscation technique. The method disclosed herein improves the above mentioned locality properties in a data processing system by performing a split between a host processor and a secure element such that the security and the quality of the obfuscation stems from the split. If the secure element has a sufficient hardware tamper resistance, an attacker would not be able to perform the operation of recovering the secret used for the obfuscation. In other words, if the attacker knows the applied obfuscation function and is able to get a copy of the software but is not able to get physical access to the hardware executing the code, then the attacker will not be able to get the secret and the second part of the function stored in the secure element, thus preventing the reverse engineering of the computer program.

In accordance with an embodiment, there is provided, a data processing system including: a first memory for storing a plurality of obfuscated instructions, wherein the plurality of obfuscated instructions were obfuscated using a function that computes an obfuscated address for each instruction of the plurality of instructions, and wherein the function is capable of being factored into a first part and a second part; a first processor, coupled to the first memory, the first processor configured to execute the plurality of obfuscated instructions; and a secure element having a second processor and a second memory, wherein the second memory stores the second part and a secret, wherein the secure element receives the plurality of obfuscated instructions from the first processor, and the second processor computes an unobfuscated address for each instruction of the plurality of obfuscated instructions using the second part and the secret, and wherein the secure element having a relatively higher level of security than the first processor and the first memory. The data processing system may be implemented on a single monolithic integrated circuit. The unobfuscated address may be used to selected a next instruction to be executed from the plurality of obfuscated instructions. The first part may be an address space randomization function. The second part may be a diversified address space randomization function. The secret may be derived from a master secret and a unique identifier of the first processor. The unique identifier may be derived according to a Device Identifier Composition Engine (DICE) standard managed by the Trusted Computing Group. The plurality of obfuscated instructions may be obfuscated using an obfuscator tool.

In another embodiment, there is provided, a method of executing an obfuscated computer program comprising a plurality of instructions, the method including: providing a function that computes an obfuscated address for each instruction of the plurality of instructions; factoring the function into a first part and a second part; storing the first part in a memory of a data processing system; storing the second part and a secret in a secure element of the data processing system, the secure element relatively more secure than the memory; receiving an instruction of the plurality of instructions in the data processing system; computing, in a processor of the data processing system, an intermediate obfuscated address using the first part; providing the intermediate obfuscated address to the secure element; and computing an unobfuscated address in the secure element using the intermediate obfuscated address, the second part, and the secret. The method may further include using the unobfuscated address to select the next instruction to be executed out of the plurality of instructions. The first part may be an address space randomization function. The second part may be a diversified address space randomization function. The secret may be derived from a master secret and an identifier of a processor in which the method is to be implemented. The identifier may be a unique to the processor and derived according to a Device Identifier Composition Engine (DICE) standard managed by the Trusted Computing Group.

In yet another embodiment, there is provided, a method of executing an obfuscated computer program, the method including: storing data in a first memory; receiving the data into a first processor as required for execution by the computer program, wherein the data is obfuscated using a function that computes an obfuscated address for a portion of the data, and wherein the function is factored into a first part and a second part; storing the second part and a secret in a second memory of a secure element, the secure element including a second processor, the secure element being relatively more secure than the processor; providing the obfuscated address to the secure element, wherein the second processor of the secure element computes an unobfuscated address from the obfuscated address using the second part and the secret; and using the unobfuscated address to select a next portion of the data to be used in the execution of the computer program. The method may be performed by a data processing system implemented on a single integrated circuit. The first part may be an address space randomization function. The second part may be a diversified address space randomization function. The secret may be derived from a master secret and an identifier of the first processor. The identifier may be unique to the first processor.

FIG. 1 illustrates data processing system 10 in accordance with an embodiment. Data processing system 10 may be implemented using one or more integrated circuits and may be used in an implementation of the described embodiments. Data processing system 10 includes bus or switching network 13 useful for communicating information between circuits and modules of data processing system 10. In one example, data processing system 10 may be a system on a chip (SoC). In another embodiment, data processing system 10 may include multiple chips, or integrated circuits (ICs). Connected to bus 13 is one or more processors 11, memory 12, and secure element 14. Secure element 14 includes processor 15 and memory 16. Note that in an actual embodiment, data processing system 10 may include additional circuits and modules including, for example, interfaces, input/output (I/O) circuits, peripherals, and additional memory. The one or more processors 11 may include any hardware device capable of executing instructions stored in memory 12. For example, processor 11 may execute an application such as for example a payment or transportation transaction. In the illustrated embodiment, processor 11 may be, for example, a microprocessor, field programmable gate array (FPGA), application-specific integrated circuit (ASIC), or similar device.

Memory 12 may be any kind of memory, such as for example, L1, L2, or L3 cache or system memory. Memory 12 may include volatile memory such as static random-access memory (SRAM) or dynamic RAM (DRAM), or may include non-volatile memory such as flash memory, read only memory (ROM), or other volatile or non-volatile memory.

Memory 12 may include multiple memory regions for storing instructions and/or data. Memory 12 may be used to store instructions for execution by processor 11, and data needed by processor 11 to execute the instructions. The stored instructions may be obfuscated instructions received from an external source, such as from an obfuscator tool (not shown).

Secure element 14 includes processor 15 and memory 16. Processor 15 is configured to execute instructions and data. Secure element 14 is tamper resistant and memory 16 is useful for storing secret and sensitive information securely. Secure element 14 is relatively more secure than the other parts of data processing system 10. In the embodiment illustrated in FIG. 1, secure element 14 is embedded in data processing system 10.

Any type of obfuscation may be used for obfuscating code or data. The type of obfuscation shown as an example is control flow obfuscation. Control flow obfuscation makes the flow of control in the execution of code more difficult for a user to discern, but still maintains the overall logic of instructions. The goal of control flow obfuscation is to make decompilation of the code useless for understanding the code such that it is difficult for an attacker to analyze the obfuscated code.

In one embodiment, a code obfuscation technique that obfuscates the control flow is based on a randomization function that computes the address of the next instruction. The function can be, for example, implemented as a function, as table lookup operations, as a state machine interpreter, or as a byte code interpreter. FIG. 1 illustrates a first part of the function labeled "f( )" stored in memory 12, and a second part of the function labeled "g( )" stored in memory 16 of secure element 15. The first part f( ) is executed by processor 11 and then processing by processor 11 moves to the secure element 14 where the second part g( ) is processed securely by processor 15.

In one example, an obfuscation of the address space of a computer program, also referred to as code, is abstracted by the function f( ) where f( ) is "f(addr)=obfuscated_address", where "addr" is the non-obfuscated address. Function f( ) may be a randomization function. Conventionally, an obfuscator generates a code f(addr,secret) that is executed by a target processor. In the herein described method, the function f(addr, secret) is split and replaced by a function f(addr) that does not contain the secret but that relies on a function g(addr, secret) stored in secure element 14. Function g(addr, secret) is known by the obfuscator that generated f(addr) with the knowledge of g(addr,secret). Moreover, because the secret is securely internalized in memory 16 of secure element 14, it is removed from g(addr, secret) to give g(addr). In other words, function f( ) does not know the secret and does not pass the secret to function g( ) in secure element 14. While executing g( ) processor 15 of secure element 14 retrieves the secret to perform the necessary computations. In another embodiment, the obfuscation technique can extend to data addresses in addition to instruction addresses.

The outcome of this construction is that the attacker must not only seize the obfuscated code from memory 12, but must also extract the "secret" out of embedded secure element 14. However, if embedded secure element 14 is sufficiently hardware tamper resistance, the attacker cannot perform the operation of recovering the secret. In other words, if the attacker knows the obfuscation technique applied to the code and is able to get a copy of the code but is not able to get data processing system 10 that executes the code or the secret and the function stored in embedded secure element 14, then the attacker cannot reverse engineer the code.

FIG. 2 illustrates an unobfuscated computer program in accordance with an embodiment. The unobfuscated computer program is a simple contrived code for the purpose of illustrating the obfuscation technique according to an embodiment. The code includes a simple 7 instructions program where the addresses are from 0 to 6 and Ix denotes an instruction and HALT is a special instruction to signal the end of execution. Address 0 is the non-obfuscated start address. The addresses are selected using a program counter (PC) that is initialized at 0.

According to an embodiment, code obfuscation applied to the control flow is implemented by replacing part of the address mapping by a computation based on a secret stored in secure element 14 and shared between secure element 14 and the obfuscator tool (not shown) used to generate the obfuscated code. This results in a hardware binding between the obfuscated code and data processing system 10, and it makes the obfuscated code not understandable without knowledge of the shared secret that is stored in secure memory 16.

FIG. 3 illustrates an obfuscated computer program in accordance with an embodiment. The computer program of FIG. 3 was obfuscated using a randomization of the address space using a parametrized obfuscation function plus an addition parametrization function with a secret parameter. The parametrized obfuscation function is factorized into the first part "f( )" and the second part "g( )". The factorized second part "g( )" of the code may be a support or auxiliary function isolated in secure element 14, and may be a known diversification function.

Note also that there could be constraints on the domain of the secret. The domain may include a range of secret values that will work with the obfuscation function being used. Therefore, the secret included in the secure element with the function "g( )" must be selected in the allowed domain. The auxiliary function g( ) may be "g(addr, secret)" where "addr" is the unobfuscated address. Pseudocode of a simple factorization and the secret may be expressed as,

```
f(addr) {
    map[ ] = { 4, 2, 3, 0, 5, 6, 1};
    return(g(map[addr]))
}
g(addr) {
    secret := 2;
    return((addr + secret) modulo 7).
```

The modulo 7 keeps addresses within a range of addresses.

Note that function "f( )", processed in the unsecure processor 11 does not require any knowledge of the "secret". Note also that sometimes the "secret" is called a "seed" in the context of code obfuscation techniques. Note that function "g( )" can return a row of addresses instead of only one address. Function "g( )" can also return an offset, an index, a reference to an address, or a symbol. Function "g( )" can be anything that gives the necessary information to the executable code to determine which next instruction is to be executed. Function "g( )" can also return a sequence of values that represent offsets, indexes, addresses or symbols to be used in further execution steps of the program on processor 11.

The function "g(addr, secret)" is implemented in embedded secure element 14. Processor 11 applies the function "f(addr)" to the obfuscated address during execution of an instruction and generates an intermediate obfuscated address that is provided to secure element 14. Secure element 14 applies function "g(addr)" to the intermediate obfuscated address, wherein g( ) has the knowledge of the secret, and gives back the transformed, unobfuscated address. In one embodiment, function "g(addr)" implements a parametrized mapping of the address "addr" to one or more new values required by processor 11 to reconstruct the unobfuscated address. The "secret" is the value used for the parametrization of the mapping. For each value of the "secret", the function "g( )" implements another mapping. The value of the "secret" is used during the computation of "g( )" by the secure element 14. The mapping implemented by "g( )" can be computed using, for example, mapping tables or mapping functions or composing several mappings. Function "g( )" should guarantee that the mapping is mapped to values that are within the range of acceptable addresses. The obfuscator tool that has constructed the program executed on processor 11 has knowledge of an inverse mapping that corresponds to the mapping implemented by "g( )" and has the knowledge of the "secret". The instructions and the calls to "f(addr)" are arranged into the program executed by processor 11 using the knowledge of the mapping that will be performed by "f(addr)" on processor 11 and on the execution of "g(addr)" in the secure element 14 using the secret "secret".

Note that the way the implementation of function "f( )" communicates with the implementation of function "g( )" can be performed in various ways. For example, it can be performed using an application protocol data unit (APDU) between a processor core of a system-on-a-chip (SoC) and the secure element on an 12C serial communication protocol, or through an intra-SoC hardware interface between a processor core of a SoC and the secure element in the same SoC.

The diversified "secret" may be linked to a derivation function using a unique identifier of a target device. This provides the ability to have a code obfuscator (not shown) to be able to generate the obfuscated code for a specific target processor of a given identity by using a secret derived from a master secret that is used with a plurality of devices and a target processor identifier of the target device of the plurality of devices. The target processor can be provisioned with the derived secret. This provides the benefit that the master secret used for all target devices is not part of the target device and therefore attacking one target device does not bring other target devices in danger. However, a drawback of this approach is that when the protection of proprietary information is the goal of the obfuscation, it may be sufficient to break one target device for a successful attack.

The binding between the code obfuscation and the hardware can be strengthened by using a root of trust such as for example a Device Identifier Composition Engine (DICE) implementation. DICE is a standard managed by the Trusted Computing Group. Using the DICE root of trust improves the quality of the secret by further binding the secret stored in the embedded secure element to the integrated circuit.

The disclosed embodiment applies to any valid code obfuscation technique that obfuscates the control flow based on a function that computes the address of the next instruction. This function can be, for example, implemented as a function, or as table lookup operations, or as a state machine interpreter, or as a byte code interpreter. Branching can be handled according to any control flow code obfuscation technique. Note that in the described embodiment, an embedded secure element is used to host the execution of "g( )" and for the storage of the "secret". However, other embodiments can be implemented by adding a specific secure block to the SoC.

The method for executing obfuscated code may also be applied to the obfuscation to the data access patterns (data flow based) instead of instruction access patterns (control flow based). For example, when processor 11 needs to access a data element at address "addr", it can refer to a data function fd(addr) that would compute an intermediate obfuscated address that would in turn resort to a data function gd(addr), where "addr" is the intermediate obfuscated address, where gd( ) is stored in secure element 14 to compute a final data address, and where gd(addr) would have the knowledge of a secret used in the computation of gd( ) Processor 11 would recover from function f(addr) the real address where the required data is located in the real memory. In one embodiment, an obfuscator could potentially apply both control flow obfuscation and data flow obfuscation using many f( ) functions and many g( ) functions with many secrets.

Figure 4:
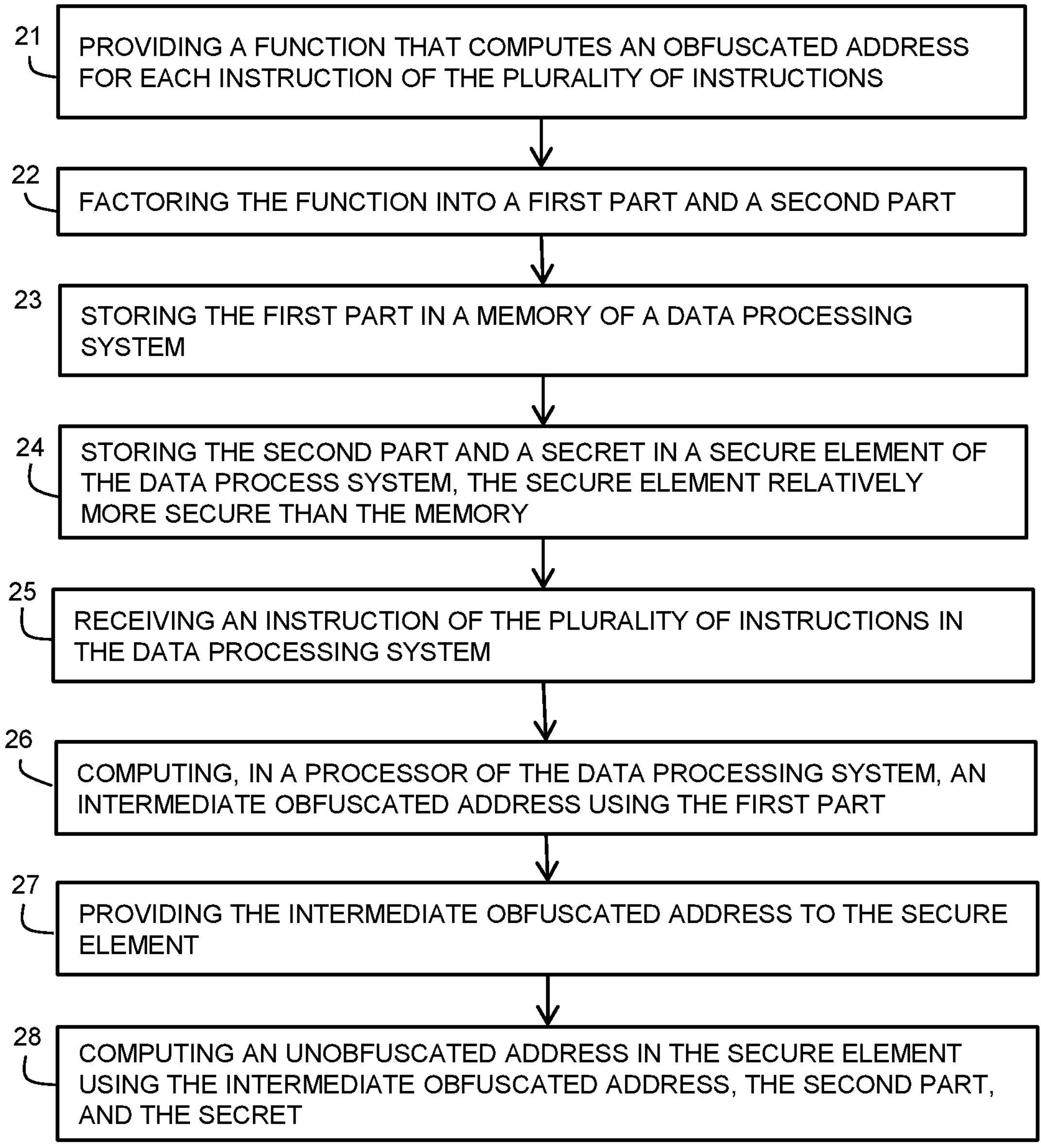
FIG. 4 illustrates a method for executing an obfuscated computer program in accordance with an embodiment.

FIG. 4 illustrates method 20 for executing an obfuscated computer program in accordance with an embodiment. Method 20 begins at block 21. At block 21, a function is provided that computes an obfuscated address for each instruction of the plurality of instructions. At block 22, the function is factored into a first part and a second part. At block 23, the first part is stored in a memory of a data processing system. At block 24, the second part and a secret are stored in a secure element of the data processing system. The secure element is relatively more secure than the memory. At block 25, an instruction of the plurality of instructions is received in the data processing system. At block 26, an intermediate obfuscated address is computed by a processor of the data processing system using the first part. At block 27, the intermediate obfuscated address is provided to the secure element. At block 28, an unobfuscated address is computed in the secure element using the intermediate obfuscated address, the second part and the secret.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system comprising: a first memory for storing a plurality of obfuscated instructions, wherein the plurality of obfuscated instructions were obfuscated using an obfuscation function that computes an obfuscated address for each instruction of the plurality of instructions, and wherein the obfuscation function is capable of being factored into an address space randomization function and a diversified address space randomization function; a first processor, coupled to the first memory, the first processor configured to execute the plurality of obfuscated instructions, wherein, in response to receiving an instruction of the plurality of obfuscated instructions for execution, the first processor is configured to compute an intermediate obfuscated address by applying the address space randomization function to an obfuscated address of the instruction without using a secret value stored in a second memory of a secure element; and the secure element having a second processor and the second memory, wherein the second memory stores the diversified address space randomization function and the secret value, wherein the secure element receives the plurality of obfuscated instructions from the first processor, including the intermediate obfuscated address of the instruction, and the second processor is configured to compute an unobfuscated address for the instruction by applying the diversified address space randomization function to the intermediate obfuscated address of the instruction, using the secret value.

2. The data processing system of claim 1, wherein the data processing system is implemented on a single monolithic integrated circuit.

3. The data processing system of claim 1, wherein the unobfuscated address is used to select a next instruction to be executed from the plurality of obfuscated instructions.

4. The data processing system of claim 1, wherein the secret value is derived from a master secret and a unique identifier of the first processor.

5. The data processing system of claim 4, wherein the unique identifier is derived according to a Device Identifier Composition Engine (DICE) standard managed by the Trusted Computing Group.

6. The data processing system of claim 1, wherein the plurality of obfuscated instructions is obfuscated using an obfuscator tool.

7. A method of executing an obfuscated computer program comprising a plurality of instructions, the method comprising: providing an obfuscation function that computes an obfuscated address for each instruction of the plurality of instructions; factoring the function into an address space randomization function and a diversified address space randomization function; storing the address space randomization function in a memory of a data processing system; storing the diversified address space randomization function and a secret value in a memory of a secure element of the data processing system; receiving an instruction of the plurality of instructions in the data processing system; computing, in a processor of the data processing system, an intermediate obfuscated address from the obfuscated address using the address space randomization function without using the secret value; providing the intermediate obfuscated address to the secure element; and computing, in a processor of the secure element, an unobfuscated address from the intermediate obfuscated address using the diversified address space randomization function and the secret value stored in the memory of the secure element.

8. The method of claim 7, further comprising using the unobfuscated address to select the next instruction to be executed out of the plurality of instructions.

9. The method of claim 7, wherein the secret value is derived from a master secret and an identifier of a processor in which the method is to be implemented.

10. The method on claim 9, wherein the identifier is a unique to the processor and derived according to a Device Identifier Composition Engine (DICE) standard managed by the Trusted Computing Group.

11. A method of executing an obfuscated computer program, the method comprising: storing data in a first memory; storing a secret value in a second memory of a secure element, the secure element including a second processor, receiving the data into a first processor as required for execution by the computer program, wherein the data is obfuscated using an obfuscation function capable of being factored into an address space randomization function and a diversified address space randomization function, wherein the first processor applies the address space randomization function to an obfuscated address to compute an intermediate address for a portion of the data, wherein the address space randomization function is applied to the obfuscated address to compute the intermediate address without using the secret value; providing the intermediate address to the secure element, wherein the second processor of the secure element applies the diversified address space randomization function to the intermediate address to compute an unobfuscated address from the obfuscated address using the secret value; and using the unobfuscated address to select a next portion of the data to be used in the execution of the computer program.

12. The method of claim 11, wherein the method is performed by a data processing system implemented on a single integrated circuit.

13. The method of claim 11, wherein the secret value is derived from a master secret and an identifier of the first processor.

14. The method of claim 13, wherein the identifier is unique to the first processor.

* * * * *